United States Patent Office 2,970,131
Patented Jan. 31, 1961

2,970,131

POLYCARBONATE PROCESS

Wendell W. Moyer, Jr., New Brunswick, John Wynstra, Berkeley Heights, and John S. Fry, Somerville, N.J., assignors to Union Carbide Corporation, a corporation of New York No Drawing. Filed Mar. 9, 1959, Ser. No. 797,868

9 Claims. (Cl. 260—47)

This invention relates in general to the production of synthetic polymers, and more particularly to an improved process for preparing polycarbonate resins.

It has formerly been proposed to prepare polycarbonate resins by the general method of direct phosgenation of a (4,4'-dihydroxy-diphenyl) alkane in the presence of a stoichiometric excess of an alkali metal hydroxide such as sodium hydroxide. More specifically it has been proposed to dissolve or suspend a (4,4'-dihydroxy-diphenyl) alkane in an aqueous solution of a stoichiometric excess of sodium hydroxide and an inert organic solvent, and then to phosgenate the (4,4'-dihydroxy-diphenyl) alkane by bubbling phosgene into the mixture while maintaining the reaction system at a temperature of about 20° C. to about 30° C. The immediate result of the phosgenation step is the production of a reaction mass consisting of an inorganic phase containing water, unreacted alkali and by-product salts of the reaction, and an organic phase which is a viscous solution of low molecular weight polycarbonates in the solvent used. By prolonged stirring in the presence of unused alkali this intermediate, low molecular weight polymer is "bodied" or further polymerized into a high molecular weight polycarbonate resin. Similar results have been achieved, and the prolonged stirring obviated, by the use of a quaternary ammonium catalyst to body the intermediate polymer. In either procedure, the final polymer mixture is neutralized with acid, washed free from electrolytes with water, and the polycarbonate resin is isolated after being coagulated with a conventional agent such as methanol, ethanol, isopropanol, acetone, boiling water or the like.

In practice, however, it has been found that polycarbonate production methods of this type are difficult to reproduce in the sense that the average molecular weight of the polycarbonates formed vary to a substantial degree from batch to batch. This difficulty is thought to be due to the effect of competing side reactions which result in small but highly significant differences in the structure of the end groups of the intermediate polymer from one batch to another. Thus, in order to approach reproducibility, the most careful control must be exercised over such factors as the total amount of phosgene added, the rate at which phosgene is introduced into the reaction mixture, the temperature of the reaction, the degree to which the reaction mixture is stirred or otherwise agitated, and the time lapse occurring between the cut-off of phosgene addition and the start of addition of the quaternary ammonium bodying agent.

Although chain growth terminators such as tert-butyl phenol have heretofore been proposed to limit the molecular weight of the polymer to the range of most practical interest, considerable variability from batch to batch occurred whether or not a terminator was employed.

It is therefore the general object of the present invention to provide a process for preparing polycarbonate resins which is improved in flexibility and control, and which will also produce a polymer product having more uniform average molecular weight and physical properties from batch to batch.

This general object as well as others which will be apparent from the specification are accomplished in accordance with the process of the present invention by reacting a di(monohydroxy-phenyl)-substituted aliphatic hydrocarbon, in which both hydroxy-phenyl groups are attached to the same carbon atom, with phosgene in the presence of an amount of alkali metal hydroxide sufficient only to impart to the reaction system a pH value of between about 10.5 and 11.55, preferably between about 10.8 and 11.3. By employing from about 5 percent to about 80 percent of the theoretical amount of alkali metal hydroxide required to react with the dihydric phenol to form the double salt thereof, a buffer solution consisting of unreacted dihydric phenol and the corresponding alkali metal salt is thus established which has a pH value within the required range. The reaction of the dihydric phenol with 50 percent of the stoichiometric quantity of aqueous caustic creates a buffer solution having a pH of about 11.3, the upper limit of the preferred range.

According to a typical embodiment of our novel process a bisphenol reactant is initially charged to a reaction vessel along with an aqueous solution of an alkali metal hydroxide containing from about 5 percent to about 80 percent of the stoichiometric quantity required to react with the bisphenol. An organic solvent for the intermediate polymer, such as methylene chloride, is added and the reaction system is closed to the atmosphere. Phosgene and additional alkali metal hydroxide are then simultaneously introduced into the reaction in such a manner as to maintain the pH of the reaction mass between 10.5 and 11.55 preferably between 10.8 and 11.3, and at a temperature of between about 20° C. and 30° C. To insure complete reaction, the addition of phosgene is continued after addition of the sodium hydroxide is complete and until the pH of the reaction mass had dropped to at least about 10, but preferably to about 7. It has been found that the total quantity of sodium hydroxide employed over the entire course of the reaction is at least about 125 percent of the theoretical amount required to react with the bisphenol constituent if the most efficient conversion is to be attained. Larger quantities may of course be used without harmful effect upon the process, but too great an excess results in needless waste of phosgene. After the phosgenation reaction has been stopped, the intermediate polymer is bodied in the conventional manner by adding a further quantity of sodium hydroxide and a quaternary ammonium compound and stirring. When the bodying operation is complete, the high molecular weight polymer is neutralized with acid, washed to remove electrolyte residue, coagulated, filtered and dried.

During the simultaneous addition of the phosgene and caustic the pH of the reaction mass may be continuously followed by means of a pH meter or by any of many well known techniques. Frequently intermittent pH measurements are entirely suitable for the purposes of this invention, since occasional or brief fluctuations in pH value which exceed the specified tolerable limits of 10.5 to 11.55 have no serious effect on the final product. However, significant variations over appreciable periods of time of the reaction cannot be tolerated and still secure the benefits of this invention. Noncontinuous measurement is, of course, advantageous if means other than a pH meter are employed.

Ideally, the phosgenation of a bisphenol in the presence of sodium hydroxide proceeds according to the following four steps:

(1) Formation of the sodium salt of the bisphenol by reaction between the bisphenol and sodium hydroxide;

(2) Reaction of phosgene with the sodium salt of the bisphenol to yield the corresponding chloroformate or dichloroformate derivative;

(3) The reaction of the chloroformate terminated bisphenol with a sodium-bis (phenolate) molecule produced by reaction step (1); and (4) The combination of reaction steps (2) and (3) to give an intermediate polymer possessing only chloroformate end groups.

However, where there is a large excess of sodium hydroxide, i.e., hydroxyl ions, as in all prior known processes, several side reactions are possible which lead to decreased process efficiency and inferior final polymer product. In particular, three such side reactions are believed to be especially harmful. These are: (a) the reaction of phosgene with aqueous sodium hydroxide to form sodium carbonate and sodium chloride; (b) the reaction of the chloroformate terminated bisphenol or the intermediate chloroformate terminated polymer with aqueous caustic whereby the sodium phenolate end groups are regenerated; and (c) the saponification of the carbonate linkages of the intermediate polymer. Saponification reaction (c) probably occurs to a much lesser extent than the other two specified side reactions.

Therefore, since sodium hydroxide reacts, for all practical purposes, quantitatively with bisphenol compounds to form the corresponding sodium salt, we have been able by limiting the quantity of caustic at all times to constantly maintain the necessary reactive sodium salt of bisphenol in the reaction mixture and at the same time the harmful side reactions, which are dependent upon a high concentration of hydroxl ions, are kept at a minimum.

The following examples are explanatory and are illustrative of our invention.

*Example I*

To a two liter glass reactor equipped with a sealed stirrer, pH meter electrodes, thermometer, gas inlet tube, dropping funnel and a reflux condenser, were charged 125.0 grams (0.55 mole) 2.2-(4, 4'-dihydroxy-diphenyl)-propane (bisphenol-A), 0.11 gram of sodium hydrosulfite, and 181 grams of water. To this mixture 11.0 grams of sodium hydroxide dissolved in 330 grams of water (25 percent of the stoichiometric amount of sodium hydroxide) was added slowly with constant stirring. The temperature of the system was established at about 25° C. and 550 grams of methylene chloride was then added. At this point the pH mixture was 11.2 With continued vigorous stirring phosgene gas was bubbled into the reactor, and simultaneously the dropwise addition of a solution containing 44 grams (1.1 moles, 100 percent stoichiometric amount) of sodium hydroxide in 80 grams of water was begun. The relative rates of addition of the sodium hydroxide and the phosgene were controlled so that the pH of the reaction mixture was maintained within the range of 10.8 to 11.3. After the addition of sodium hydroxide solution was complete, phosgene addition was continued until the pH of the reaction mass had dropped to 7.0. Throughout the entire phosgenation reaction period (5 hrs. 30 min.), temperature of the system was maintained at 25° C.±3. The intermediate low molecular weight polymer was then bodied by adding 30.0 grams of sodium hydroxide in the form of a 33 percent aqueous solution and 4.58 grams of benzyltrimethylammonium chloride in the form of a 60 percent aqueous solution and stirring the mixture for about 1 hour at 25° C.±3. Upon settling, an aqueous layer developed which was drawn off, and the polymer solution was washed several times with water and then neutralized with dilute (ca. 1 percent) hydrochloric acid solution and again washed with water until the aqueous extracts tested negative for chloride ion with silver nitrate. The polymer was then coagulated by vigorous stirring with about 1,200 ml. of isopropanol, filtered, and dried. The final polycarbonate resin had a reduced viscosity at 25° C. in methylene chloride of 2.4, indicating a reaction conversion of 99.83 percent.

*Example II*

The procedure of Example I was repeated using the following formulation as the initial charge to the reactor 2,2 - (4,4' - dihydroxy - diphenyl-propane)_____ 125.0 grams (0.55 mole).
Sodium hydroxide (in 330 grams $H_2O$)_____ 18.3 grams (0.46 mole).
Sodium hydrosulfite (antioxidant)_____ .11 gram.
Water_____ 181.0 grams.
Methylene chloride_____ 550 grams.

The phosgene addition period was 4 hrs. and 55 minutes during which period 36.6 grams of sodium hydroxide, other than initially charged, was added in solution in 80 grams of water. pH range during simultaneous addition of phosgene and sodium hydroxide was maintained between 11.0 and 11.55. Phosgene addition was terminated when pH had dropped to 7.0. The intermediate polymer was bodied, purified and isolated according to the same procedure and using the same formulation as in Example I. Reduced viscosity of the polymer in a methylene chloride solution at 25° C. containing 0.2 gram polymer per 100 ml. solution was 2.26. Minimum conversion of phenolic hydroxyl to carbonate ester was 99.81 percent.

*Example III*

Example II was repeated except that the phosgenation period was extended to 5 hours and 19 minutes. The final polymer had a reduced viscosity (methylene chloride, 25° C.) of 2.35. Reaction conversion indicated, 99.82 percent.

*Example IV*

(A) The procedure of Example I was repeated using the following formulation as the initial charge to the reactor 2,2, - (4,4' - dihydroxy - diphenyl)-propane_____ 125.0 grams (0.55 mole).
Sodium hydroxide (in 330 grams $H_2O$)_____ 11.0 grams (25% of theoretical).
Sodium hydrosulfite_____ .11 gram.
Water_____ 181.0 grams.
Methylene chloride_____ 550.0 grams.

The phosgene addition period was 4 hours and 57 minutes, during which time 46.2 grams (105% of theoretical) of sodium hydroxide dissolved in 80 grams of water were introduced into the reactor in addition to the amount initially charged, pH range during phosgenation was 10.8 to 11.5. Phosgene addition was terminated when the pH had dropped to 7.0. The intermediate polymer was bodied, purified, and isolated according to the same procedure and using the same formulation as in Example I. The final polymer had a reduced viscosity (methylene chloride, 25° C.) of 2.14. Reaction conversion indicated, 99.80 percent.

(B) The effect of using less than about 125% of the stoichiometric amount of sodium hydroxide was demonstrated by repeating part (A) of this example except that in addition to the 11.0 grams (25% of theoretical) of sodium hydroxide initially charged to the reaction, only 39.6 grams (90% of theoretical) were added during phosgenation to total 115% of the stoichiometric amount. Phosgene addition period was 4 hours and 35 minutes and was terminated at a pH of 7. Unreacted 2,2-(4,4'-dihydroxy-diphenyl)-propane recovered from aqueous alkaline extracts amounted to 10.2 grams or 8.15% of the initial charge. The reduced viscosity of the final polymer was 1.64 (methylene chloride, 25° C.).

(C) Part (B) of this example was repeated using a 25% theoretical quantity of initially charged sodium hydroxide and a subsequently introduced amount of 95% of theoretical for a total of 120% of the stoichiometric amount unreacted 2,2-(4,4'-dihydroxy-diphenyl)-propane recovered from aqueous alkaline extracts amounted to 6.86 grams or 5.5% of the initial charge. The reduced viscosity of the final polymer product was 1.59 (methylene chloride, 25° C.).

Example V

Example IV-(A) was repeated except that the phosgene addition rate, and consequently the sodium hydroxide addition rate, was increased so that the total time of phosgenation was reduced to 2 hours and 39 minutes. The reduced viscosity of the final polymer product was 2.24 (methylene chloride, 25° C.). Percent conversion indicated, 99.81 percent. The experiment demonstrated that the efficiency of the reaction and the nature of the intermediate polymer are independent of the length of time permitted for phosgenation so long as the pH of the reaction system is maintained within the limits of 10.5 to 11.55 required for the practice of this invention.

Example VI

Example I was repeated except that the quantity of all constituents of the reactive mixture was doubled. The period of time over which phosgene was added was extended to 10 hours and 51 minutes. Reagents used for bodying the intermediate polymer were also doubled in amount. The reduced viscosity of the final polymer product (0.2 g. polymer in 100 ml. methylene chloride at 25° C.) was 2.13. Indicated conversion, 99.80 percent.

Example VII

Example VI was repeated except that the period of 10 hours and 55 minutes during which phosgene was introduced into the reactor was divided into two periods of 5 hours, and 5 hours and 55 minutes respectively. At the termination of the first period of 5 hours, the reaction mass was maintained, at the pH then existing, for 40 hours before the second phosgenation period of 5 hours and 55 minutes was commenced. The final polymer product had a reduced viscosity (0.2 gm. polymerin 100 ml. methylene chloride at 25° C.) of 1.70. Indicated conversion, 99.75 percent. This example demonstrates the independence of the addition time and the addition rate of phosgene into the reaction mixture which is achieved by the present process. Under such stringent conditions, a decrease of the reduced viscosity of only .43 is exceptionally good.

Example VIII in conjunction with Examples IX, X, and XI below shows the outstanding capability of the present process to produce a final polymer having a substantially uniform reduced viscosity from batch to batch even though extreme variations in certain factors were induced which were prohibitive in prior art methods if reproducibility was to be achieved. In these following four examples a phenol chain growth stopper was utilized.

Example VIII

The procedure and constituent formulation of Example VI was duplicated except that 4.240 grams of p-phenylphenol was added to the initial charge to the reactors, and with the further exceptions that the period of 10 hours and 52 minutes during which phosgene was introduced into the reactor was divided into two periods of 6 hours, 30 minutes and 4 hours, 22 minutes respectively with a suspension of the reaction for 16 hours between the two phosgenation periods. The final polymer had a reduced viscosity (0.2 gram polymer in 100 ml. methylene chloride) of 0.68.

Example IX

Example I was repeated except that 2.120 grams of p-phenylphenol was charged with the original reaction mixture. The final polymer product had a reduced viscosity (0.2 gram polymer in 100 ml. methylene chloride at 25° C.) of 0.62.

Example X

Example IX was repeated using the following formulation:

Initial charge to reactor:
  2,2 - (4,4' - dihydroxy - diphenyl)-propane_____ 125.0 grams (0.55 mole).
  Sodium hydroxide (in 37 g. $H_2O$) 20.2 grams.
  Sodium hydrosulfite (antioxidant)_____ .11 gram.
  Water_____ 181.0 grams
  Methylene chloride_____ 550 grams.
  p-phenylphenol_____ 1.73 grams.
Subsequently added:
  Sodium hydroxide (in 372 grams $H_2O$)_____ 34.8 grams.
  Phosgene (stoichiometric excess).

The phosgene addition period was 2 hours and 40 minutes. The intermediate polymer was bodied according to the procedure of Example I using 30 grams of sodium hydroxide in a 50% aqueous solution. The final polymer product had a reduced viscosity (0.2 gram polymer in 100 ml. methylene chloride at 25° C.) of 0.71.

Example XI (A) Example X was repeated using the following:

Initial charge to reactor: Grams
  2,2-(4,4'-dihydroxy-diphenyl)-propane _____ 125.0
  Sodium hydroxide (in 55 g. of $H_2O$)_____ 22.0
  Sodium hydrosulfite (antioxidant)_____ .11
  Water _____ 181.0
  Methylene chloride_____ 550.0
  p-phenylphenol _____ 1.73
Subsequently added:
  Sodium hydroxide (in 255 grams $H_2O$)_____ 33.0
  Phosgene (stoichiometric excess).

The phosgene addition period was 1 hour and 45 minutes. Phosgene addition terminated at pH=7.0. Final polymer had a reduced viscosity (0.2 gram polymer in 100 ml. methylene chloride at 25° C.) of 0.75.

(B) Part (A) was repeated. Final polymer has a reduced viscosity of 0.71.

As is readily ascertainable from the foregoing examples, the process of this invention results in the substantially complete conversion of the bisphenol reactant to its corresponding ester and in the preservation of the chloroformate end groups on the intermediate polymer molecules. The high molecular weight of the final polymer product when no polymer chain terminator is present, and the high degree of reproducibility attained when chain growth stoppers are used to control the molecular weight within narrow limits of particular interest, substantiate this view.

For the purposes of clearly pointing out the superiority of the present process over prior known methods, four identical experiments were run in which 2,2-(4,4'-dihydroxy-diphenyl)-propane was phosgenated in the initial presence of a stoichiometric excess of sodium hydroxide at a temperature of about 25° C. Reduced viscosity values (0.2 polymer in 100 ml. methylene chloride at 25° C.) of the final polymer were found to vary from 0.42 to 1.59. Three additional experiments using the same procedure and formulation as above, except that 0.375% by weight (based on the weight of bisphenol-A) of tert.-butyl phenol was also initially charged to the reactor as a chain terminator. Reduced viscosity values of 0.75, 1.05, and 1.20 were obtained. Although reproducibility was improved by the use of a chain growth terminator, the problem of non-reproducibility was clearly not overcome.

Reproducibility of the process of the present invention is evident from the examples. For instance in Examples VIII and IX in which the same amount of p-phenylphenol terminator relative to bisphenol was used, the final polymers obtained had reduced viscosity values of 0.68 and 0.62 respectively. Similarly in Examples X, XI–A, and XI–B all three of which employed an identical amount of terminator although not the same as in Examples VIII and IX, final polymer products having reduced viscosities of 0.71, 0.75, and 0.71 respectively were obtained.

The procedure set forth in the foregoing examples is generally applicable for the preparation of all polycarbonate polymers and copolymers. Thus any of the dihydric phenols, particularly (4,4'dihydroxy-diphenyl)-alkanes having from one to six carbon atoms in the central alkane group; the bisphenols of acetophenone, acetaldehyde, propionaldehyde and the like; resorcinol, hydroquinone, particularly in admixture with (4,4'-dihydroxy-diphenyl)-alkanes; and the alkylated and halogenated analogues of the compounds may suitably be phosgenated to form polycarbonates according to this process.

Illustrative of the broad class of dihydric phenols which may suitably be employed in the practice of this invention are (4,4'dihydroxy-diphenyl)-methane; 2,2(4,4'dihydroxy-diphenyl) propane; 1,1 - (4,4' - dihydroxy - diphenyl) cyclohexane; 1,1(4,4' - dihydroxy - 3,3' - dimethyl diphenyl) cyclohexane; 1,1(2,2'-dihydroxy-4,4'-dimethyl-diphenyl) butane; 2,2'(2,2''-dihydroxyl-4,4'di-tert-butyl-diphenyl)propane; 1,1-(4,4' - dihydroxy - diphenyl)-1-phenyl-ethane; 2,2-(4,4' - dihydroxy - diphenyl) butane; 3,3(4,4' - dihydroxy - diphenyl) pentane; 2,2-(4,4'-dihydroxy - diphenyl) - hexane; 3,3(4,4'-dihydroxy-diphenyl) hexane; 2,2-(4,4'-dihydroxy-diphenyl) tridecane; 2,2'(4,4'-di-hydroxy-3'-methyl-diphenyl) propane; 2,2(4,4'-dihydroxy-3-methyl-3'-isopropyl-diphenyl) butane; 2,2-(3,5,3', 5' - tetrachloro - 4,4'-dihydroxy-diphenyl) propane; 2,2-(3,5,3',5'-tetrahbromo-4,4'-dihydroxy-diphenyl) propane; (2,2'-dihydroxy-5,5'-difluoro-diphenyl)methane; (4,4'-dihydroxy-disphenyl)-phenyl-methane; 1,3-dihydroxy-benzene and 1,4-dihydroxy benzene; and mixtures thereof.

These dihydric phenols and others of the same class are well-known in the art and have frequently been employed in the production of polycarbonate resins by prior known processes.

Other modifications may similarly be made without departing from the proper scope of the invention. The amount of water initially charged to the reactor, for instance, is by no means critical and may be considerably more or less than shown in the examples without adversely affecting the course of the reaction. In another instance, the concentration of the sodium hydroxide solution which is introduced into the reactor simultaneously with the phosgene is also not critical. If the concentration of sodium hydroxide in this solution is quite large, the solution is viscous and not so easily metered. If the concentration is quite low, needless enlargement of the reactor may be required to accommodate the large amount of solution required. For these reasons the preferred concentration of the solution is from about 20 to 40 percent sodium hydroxide.

Reaction temperatures in the range of about 20° C. to about 30° C. have been found to be the most suitable for the process, although operation at temperatures either above or below this range is well within the skill of one trained in the art.

In bodying the intermediate polymer into a higher molecular weight polymer conventional procedures may be employed which are well known in the art. The most satisfactory method has been found to be stirring the intermediate polymer in the presence of a strong sodium hydroxide solution and a quaternary ammonium salt. The quantity of neither of these bodying agents is critical. For speed and efficiency of operation, however, it is preferred to use 16 parts by weight of NaOH per 100 parts by weight of the initial bisphenol or corresponding diphenol used. For like reasons, 0.0125 to about 0.05 mole of the quaternary ammonium catalyst per mole of initial diphenol is preferred, although much larger amounts may be employed without harmful results so long as the final polymer is not permitted to stand in contact with the unused catalyst for protracted periods of time.

Where chain length control is desired, any of the well known compounds functioning as such are entirely suitable. Particularly satisfactory are those categorized as monophenols, such as phenol, substituted phenols and the like, with an especial preference for p-phenylphenol.

It is believed the process disclosed herein provides advantages which are not in the aggregate available in any other known method. These advantages include; a more exact control over the course of the phosgenation step—thus greater reproducibility; greater assurance of the completeness of the reaction without jeopardizing the alkali reserve required for the intermediate polymer coupling reaction; freedom from concern with inert impurities in the phosgene; the absence of a monomer recovery problem; a greatly lessened tendency for the reaction mass to completely emulsify; and a substantially lessened extent of side reaction occurrence so that greater latitude is now possible with respect to such variables as phosgene addition rate, total phosgene addition time, reaction temperature, and time lapse between phosgene addition cut-off and quaternary catalyst addition.

What is claimed is:

1. A process for preparing substantially linear, thermoplastic polycarbonate resins which comprises reacting a di(monohydroxy-phenyl)-substituted aliphatic hydrocarbon, in which both hydroxy-phenyl groups are attached to the same carbon atom, with phosgene in the presence of an alkali metal hydroxide, said alkali metal hydroxide being present in an amount sufficient to impart to the reaction system a pH valve between about 10.5 and 11.55.

2. A process for preparing a substantially linear thermoplastic polycarbonate resin which comprises reacting phosgene with a (4,4'-dihydroxy-diphenyl)-alkane having both hydroxy-phenyl groups attached to the same carbon atom in an inert organic solvent medium and in the presence of an aqueous alkali metal hydroxide solution, said alkali metal hydroxide being present in an amount sufficient to impart to the reaction system a pH value between about 10.8 and about 11.3.

3. A process according to claim 2 in which the (4,4'-dihydroxy-diphenyl) alkane has the general formula

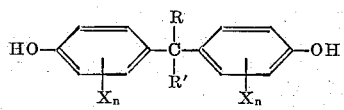

wherein R and R' are each selected from the group consisting of hydrogen and alkyl groups, X is selected from the group consisting of halogen and alkyl groups and $n$ is a numeral having a value of from 0 to 2.

4. A process according to claim 3 wherein R and R' are each methyl groups and $n$ has a value of zero.

5. A process for preparing substantially linear thermoplastic polycarbonate resins which comprises reacting phosgene with a dihydric phenol having the general formula

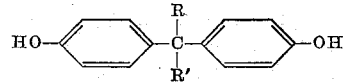

wherein R and R' are each selected from the group consisting of hydrogen and alkyl groups containing from 1 to 6 carbon atoms, said reaction being carried out at a temperature in the range of from about 20° C. to about 30° C. and in the presence of an inert organic solvent, a mono phenol chain growth terminator, and an aqueous solution of an alkali metal hydroxide, said alkali metal hydroxide being present in an amount sufficient to maintain the pH of the reaction system at a value between about 10.8 and about 11.3.

6. The process according to claim 5 in which R and R' are each methyl groups.

7. A process for preparing a substantially linear thermoplastic polycarbonate resin which includes the steps of forming a mixture consisting essentially of water, a bisphenol having the general formula

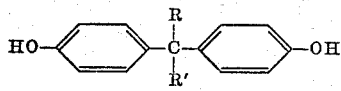

wherein R and R' are each selected from the group consisting of hydrogen and alkyl groups, the double alkali metal salt of said bisphenol, and an inert organic solvent for phosgene, said bisphenol and the said double salt thereof being present in proportions whereby the pH of said mixture is in the range of about 10.5 to about 11.55, contacting said mixture with phosgene at a temperature between about 20° C. and 30° C., while maintaining the pH of the reaction system substantially within the aforesaid range by simultaneous addition of an alkali metal base until substantially all of the bisphenol is phosgenated.

8. A process for preparing a substantially linear thermoplastic polycarbonate resin which includes the steps of forming a mixture consisting essentially of water, a bisphenol having the general formula

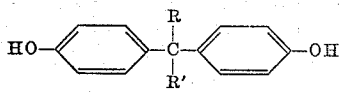

wherein R and R' are each selected from the group consisting of hydrogen and alkyl groups, the alkali metal salt of said bisphenol, and an inert organic solvent for phosgene, said bisphenol and the said salt thereof being present in proportions whereby the pH of said mixture is in the range of about 10.5 to about 11.55, contacting said mixture with phosgene at a temperature between about 20° C. and 30° C. while maintaining the pH of the reaction system substantially within the aforesaid range by simultaneous addition of an alkali metal base until substantially all of the bisphenol is phosgenated and thereafter contacting the phosgenated bisphenol with a quaternary ammonium salt catalyst to form a high molecular weight polymer.

9. A process according to claim 7 in which the bisphenol employed is 2,2(4,4'-dihydroxy-diphenyl)propane and the inert organic solvent is methylene chloride.

References Cited in the file of this patent

Schnell: "Angewandte Chemie," 68, No. 20, pp. 633–640, October 21, 1956.

Notice of Adverse Decision in Interference

In Interference No. 92,344 involving Patent No. 2,970,131, W. W. Moyer, Jr., J. Wynstra and J. S. Fry, POLYCARBONATE PROCESS, final judgment adverse to the patentees was rendered Mar. 29, 1965, as to claims 1, 2, 3, 4, 7 and 9.

[*Official Gazette September 28, 1965.*]